United States Patent
Uzawa et al.

(10) Patent No.: US 12,381,801 B2
(45) Date of Patent: Aug. 5, 2025

(54) TRAFFIC MONITORING DEVICE AND TRAFFIC MONITORING METHOD

(71) Applicant: Nippon Telegraph and Telephone Corporation, Tokyo (JP)

(72) Inventors: Hiroyuki Uzawa, Tokyo (JP); Yusuke Sekihara, Tokyo (JP); Saki Hatta, Tokyo (JP); Shuhei Yoshida, Tokyo (JP); Namiko Ikeda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 66 days.

(21) Appl. No.: 18/573,730

(22) PCT Filed: Jun. 30, 2021

(86) PCT No.: PCT/JP2021/024785
§ 371 (c)(1),
(2) Date: Dec. 22, 2023

(87) PCT Pub. No.: WO2023/276054
PCT Pub. Date: Jan. 5, 2023

(65) Prior Publication Data
US 2024/0235974 A1   Jul. 11, 2024

(51) Int. Cl.
*H04L 43/0876* (2022.01)
*H04L 43/026* (2022.01)
*H04L 43/022* (2022.01)

(52) U.S. Cl.
CPC ........ *H04L 43/0876* (2013.01); *H04L 43/026* (2013.01); *H04L 43/022* (2013.01)

(58) Field of Classification Search
None
See application file for complete search history.

(56) References Cited

U.S. PATENT DOCUMENTS 11,683,255 B2 * 6/2023 Yoshida ............... H04L 41/069
 709/224
2022/0417118 A1 12/2022 Ukon et al.
(Continued)

FOREIGN PATENT DOCUMENTS

| JP | 2012-23687 | * | 2/2012 | ............ H04L 12/70 |
| WO | WO-2020230265 A1 | * | 11/2020 | ........... H04L 41/069 |
| WO | 2021001879 A1 | | 7/2021 | |

OTHER PUBLICATIONS

Ikeda et al., "Traffic Monitoring System for Network Virtualization with Hardware Accelerator (1) ~ System Architecture to Realize Traffic Visualization ~," 2020 General Meeting of the Institute of Electronics, Information and Communications Technology, Mar. 17, 2020, 1 page.

(Continued)

*Primary Examiner* — June Sison
(74) *Attorney, Agent, or Firm* — Slater Matsil, LLP

(57) ABSTRACT

A traffic monitoring device includes an identification unit that identifies a flow of a packet received from a monitoring target network into a flow of a first flow group and a second flow group other than the first flow group on the basis of a rule table in which a predetermined rule is registered, a traffic aggregation unit that aggregates a traffic amount of the first flow group for each flow, an occurrence probability calculation unit that calculates an occurrence probability of each flow on the basis of a result of sampling at least some of the flow of the packet received, and a traffic estimation unit that estimates a traffic amount of each flow of the second flow group by multiplying the occurrence probability of each flow by the total value of the traffic amount of the second flow group.

18 Claims, 15 Drawing Sheets

(56) References Cited

U.S. PATENT DOCUMENTS

| | | | |
|---|---|---|---|
| 2023/0067780 A1* | 3/2023 | Shimoda | H04L 43/18 |
| 2024/0372815 A1* | 11/2024 | Sirov | H04L 43/55 |
| 2024/0406089 A1* | 12/2024 | Hatta | H04L 43/026 |

OTHER PUBLICATIONS

Kawahara et al., "Abnormal traffic measurement analysis method," NTT Technical Journal. vol. 20, No. 3, 2008, 5 pages. As discussed in the specification.

* cited by examiner

TRAFFIC MONITORING DEVICE AND TRAFFIC MONITORING METHOD

CROSS-REFERENCE TO RELATED APPLICATIONS

This application is a national phase entry of PCT Application No. PCT/JP2021/024785, filed on Jun. 30, 2021, which application is hereby incorporated herein by reference.

TECHNICAL FIELD

The present invention relates to a traffic monitoring technology of monitoring traffic in a network.

BACKGROUND

With the progress of virtualization technology in network functions virtualization (NFV)/software defined networking (SDN), various services using a virtual machine (VM) and the like are provided. The operation management of these services requires a device that monitors the traffic amount (the number of packets and the like) of each flow (aggregate of packets having the same rule of combination of transmission source/destination MAC address, IP address, and the like) flowing on the virtual network in real time.

As a traffic monitoring device that acquires the traffic amount of each flow in real time, for example, Patent Literature 1 and Non Patent Literature 1 propose a configuration as illustrated in FIG. 15. The traffic monitoring device of FIG. 15 includes a packet analysis unit 11 and a flow identification unit 12 in order to specify the flow of the input packet. The flow identification unit 12 identifies a specific flow on the basis of a rule table 100 in which a rule corresponding to each flow is recorded.

When a packet is input, the packet analysis unit extracts header information, collates the extracted information with a rule group registered in advance in the rule table 100, and specifies a matching rule, thereby identifying a flow of the packet. A per-registered flow traffic aggregation unit 13 updates the traffic amount of the corresponding flow on the basis of the identification result. The aggregation file generation unit 14 periodically acquires the traffic amount of each flow aggregated by the per-registered flow traffic aggregation unit 13, converts the traffic amount into a file, and stores the file in a storage unit 15.

CITATION LIST

Patent Literature

Patent Literature 1: WO 2021/001879 A

Non Patent Literature

Non Patent Literature 1: Nami IKEDA et al., "Development of Traffic Monitoring System for Network Virtualization with Hardware Accelerator (1)—System Architecture for Achieving Traffic Visualization—", The Institute of Electronics, Information and Communication Engineers (IEICE) General Conference, March 2020.
Non Patent Literature 2: Ryoichi Kawahara et al., "Abnormal Traffic Measurement and Analysis Technique", NTI Technical Journal, March 2008.

SUMMARY

Technical Problem

In a conventional traffic monitoring device, components from the packet analysis unit 11 to the per-registered flow traffic aggregation unit 13 are implemented in hardware for real-time monitoring. The rule table 100 is configured using an SRAM or the like capable of high-speed memory access in order to enable real-time processing. Here, since the SRAM has a limited mountable size, there is a case where rules corresponding to all the flows cannot be registered.

As another traffic monitoring method, a method of sampling input packets at regular intervals and estimating a traffic amount of each flow flowing through a monitoring target network 200 from the sampled packet group has also been proposed (see, for example, Non Patent Literature 2). If the sampling rate is low, a large amount of rules can be managed in a low-speed and large-capacity memory, and implementation can be performed also by software.

However, in the technology of Non Patent Literature 2, traffic information in a period in which sampling is not performed is absent, and thus it is difficult to monitor the traffic amount in real time. Therefore, there is a problem that it is difficult to monitor the traffic amounts of all the flows flowing through the monitoring target network 200 in real time.

The present invention has been made to solve the above problems, and an object thereof is to provide a traffic monitoring device capable of monitoring traffic amounts of all flows flowing through a monitoring target network in real time without increasing a capacity of hardware.

Solution to Problem

In order to solve the above problem, a traffic monitoring device of embodiments of the present invention includes: an identification unit that identifies a flow of a packet received from a monitoring target network into a flow of a first flow group and a second flow group other than the first flow group on the basis of a rule table in which a predetermined rule is registered; a traffic aggregation unit that aggregates a traffic amount of the first flow group for each flow; an occurrence probability calculation unit that calculates an occurrence probability of each flow on the basis of a result of sampling the flow of the packet received; and a traffic estimation unit that estimates a traffic amount of each flow of the second flow group by multiplying the total value of the traffic amount of the second flow group by the occurrence probability of each flow.

In order to solve the above problem, a traffic monitoring method of embodiments of the present invention is a traffic monitoring method in a traffic monitoring device that monitors traffic of a packet flowing through a monitoring target network, the method including: an identification step of identifying a flow of a packet received from a monitoring target network into a flow of a first flow group and a second flow group other than the first flow group on the basis of a rule table in which a predetermined rule is registered; a traffic aggregation step of aggregating a traffic amount of the first flow group for each flow; an occurrence probability calculation step of calculating an occurrence probability of each flow on the basis of a result of sampling the flow of the packet received; and a traffic estimation step of estimating a traffic amount of each flow of the second flow group by multiplying the total value of the traffic amount of the second flow group by the occurrence probability of each flow.

Advantageous Effects of Embodiments of the Invention

According to embodiments of the present invention, it is possible to provide a traffic monitoring device capable of monitoring traffic amounts of all flows flowing through a monitoring target network in real time without increasing a capacity of hardware.

DETAILED DESCRIPTION OF ILLUSTRATIVE EMBODIMENTS

Hereinafter, embodiments of the present invention will be described in detail with reference to the drawings. The embodiments of the present invention are not limited to the following embodiments.

First Embodiment

Configuration of Traffic Monitoring Device

Figure 1:
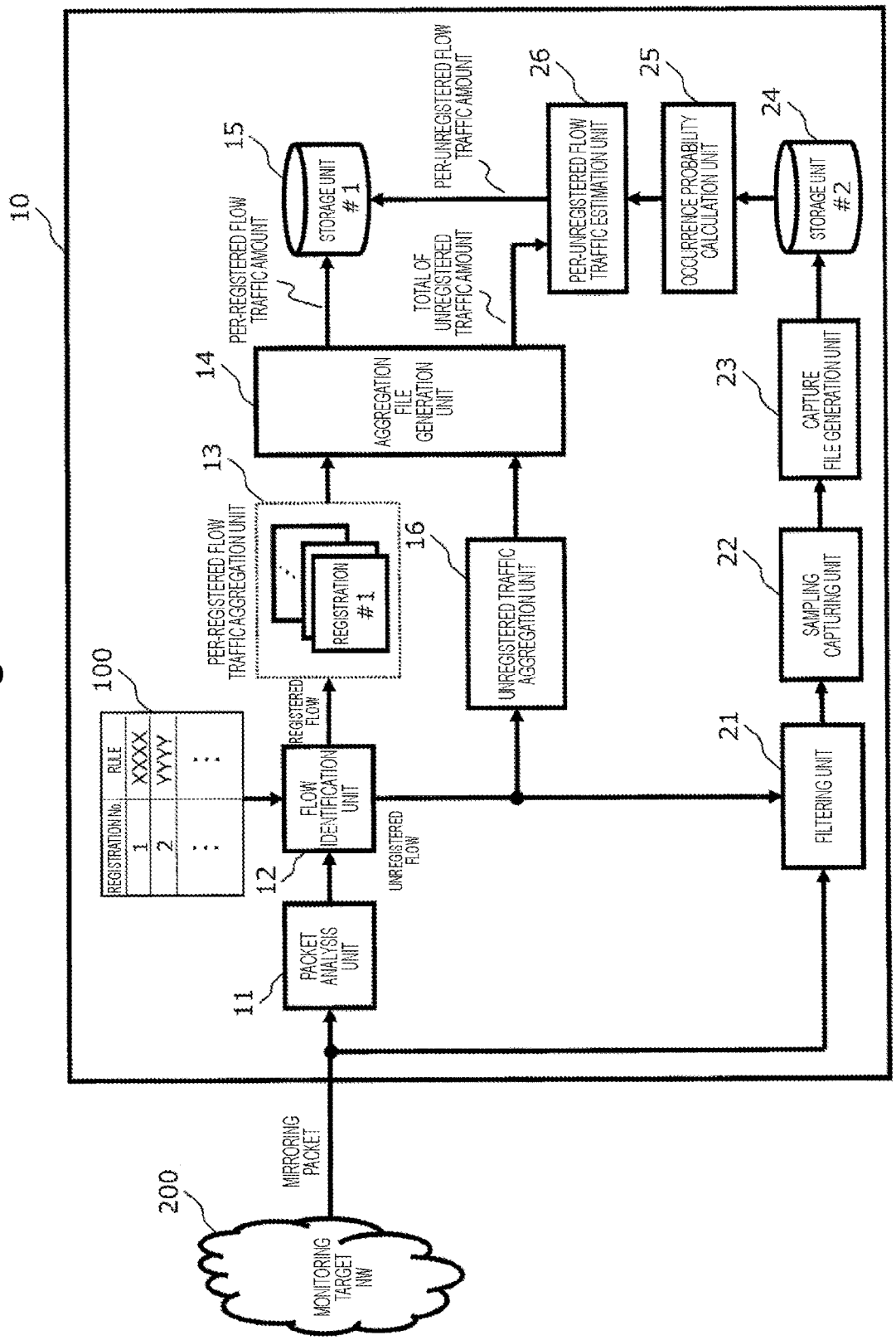
FIG. 1 is a diagram illustrating a configuration example of a traffic monitoring device according to a first embodiment of the present invention.

FIG. 1 is a diagram illustrating a configuration example of a traffic monitoring device according to a first embodiment of the present invention. A traffic monitoring device 10 includes, in addition to a conventional configuration for identifying a registered flow (first flow group) on the basis of a rule registered in a rule table 100, an unregistered traffic aggregation unit 16 for acquiring all total traffic amounts of unregistered flows (second flow group) in real time, a processing unit for obtaining an occurrence probability of the unregistered flows, and a per-unregistered flow traffic estimation unit 26 for calculating an estimated value of a traffic amount of the unregistered flows by multiplying the total traffic amount and the occurrence probability. The processing unit for obtaining the occurrence probability of the unregistered flow includes a filtering unit 21, a sampling capturing unit 22, a capture file generation unit 23, a storage unit #2 24, and an occurrence probability calculation unit 25.

Traffic Monitoring in Present Embodiment

In the traffic monitoring device 10 of the present embodiment, in addition to the conventional configuration for performing real-time monitoring of the traffic amount of the flow corresponding to the registered rule registered in the rule table 100, an estimated value of the traffic amount of the flow corresponding to the unregistered rule not registered in the rule table 100 is calculated and monitored in real time.

Figure 2:
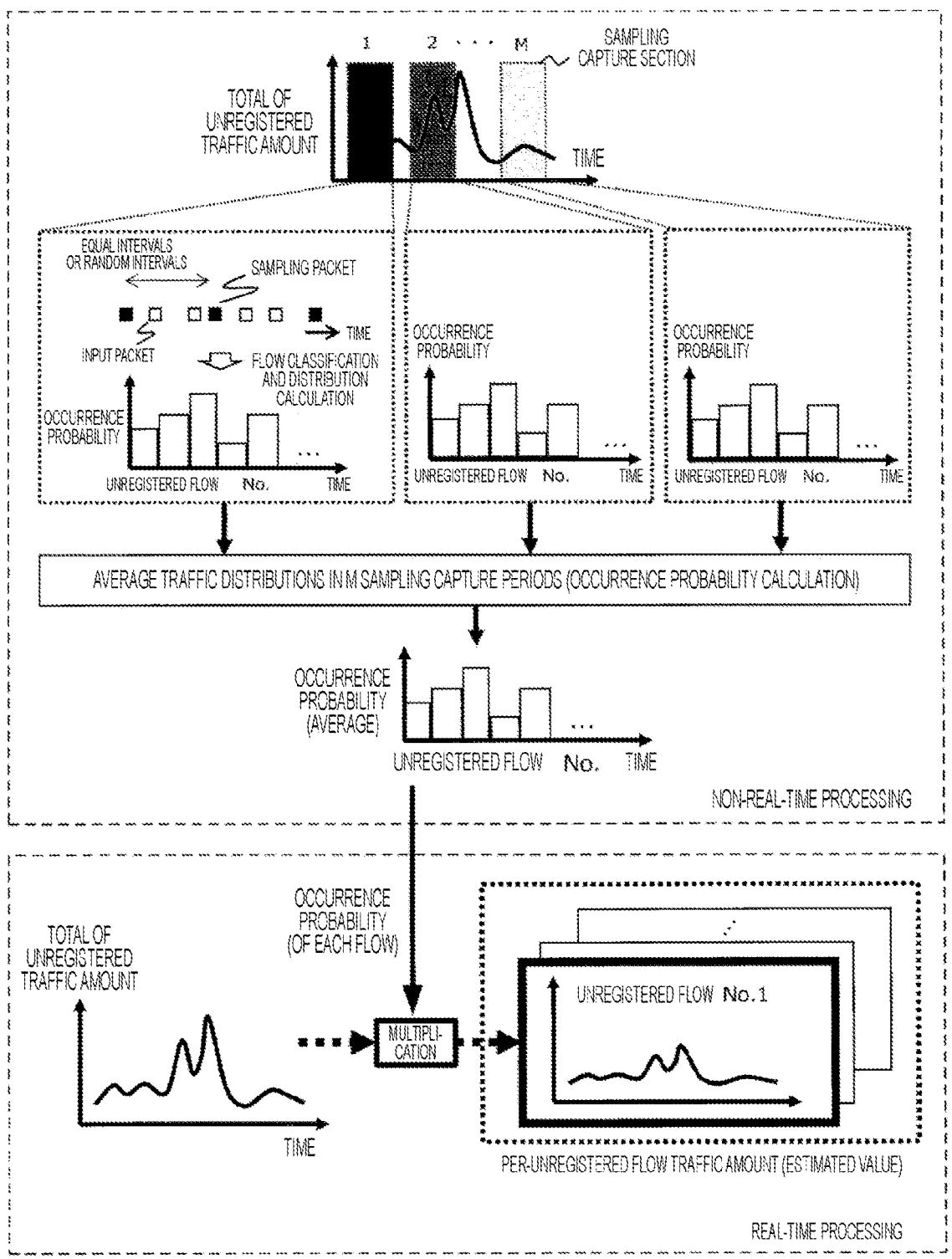
FIG. 2 is a diagram for explaining estimation of a traffic amount according to the first embodiment of the present invention.

FIG. 2 is a diagram for explaining estimation of a traffic amount according to the first embodiment of the present invention. Regarding the estimated value of the traffic amount of the unregistered rule, the estimated value of the traffic amount of each unregistered flow can be obtained by acquiring the total traffic amount of the flows (unregistered flows) corresponding to the unregistered rule and multiplying the total traffic amount by the occurrence probability of each unregistered flow. The occurrence probability of each unregistered flow is calculated on the basis of a result of sampling traffic of the unregistered flow.

The acquisition of the total traffic amount and the calculation of the estimated value of the traffic amount by multiplying the total traffic amount by the occurrence probability are performed as real-time processing, and the calculation of the occurrence probability is performed as non-real-time processing of repeating the update of the plurality of sampling sections as an average value of the plurality of sampling sections. With such a configuration, it is possible to estimate the traffic amount of a large number of unregistered flows by using the low-speed and large-capacity memory, and it is possible to monitor the traffic amount of a large number of flows both inside and outside the registration in real time.

Operation of Traffic Monitoring Method

Figure 3:
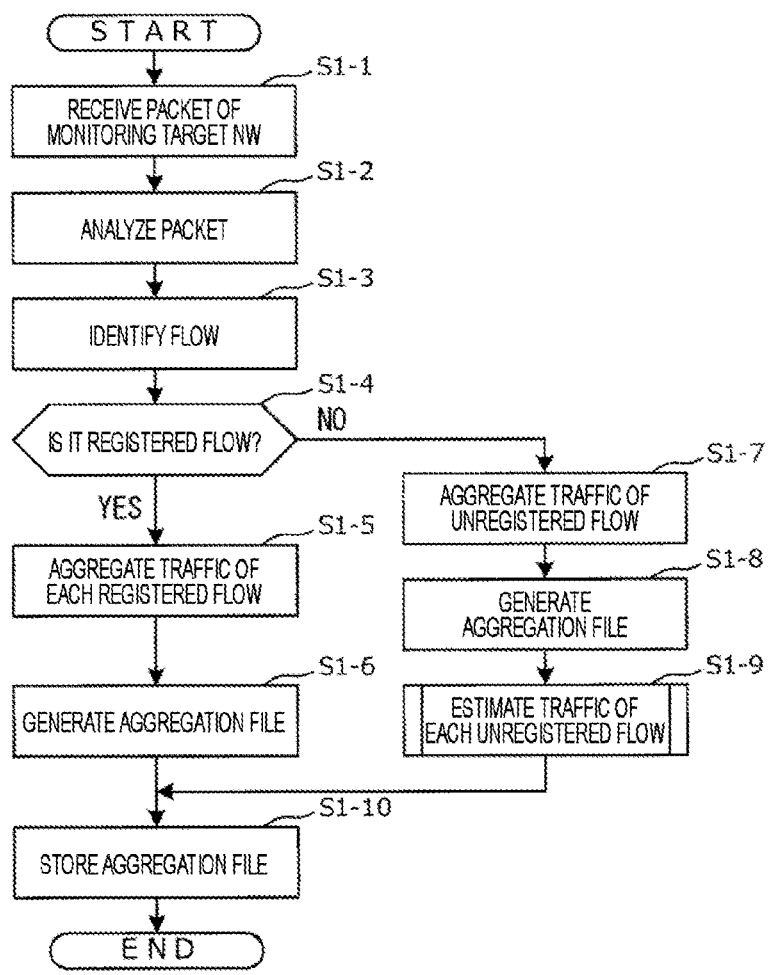
FIG. 3 is a diagram illustrating an operation flow of a traffic monitoring method according to the first embodiment of the present invention.

FIG. 3 is a diagram illustrating an operation flow of a traffic monitoring method according to the first embodiment of the present invention. In the traffic monitoring device 10 of the present embodiment, a duplicated packet is received from the monitoring target network 200, and the packet analysis unit 11 performs packet analysis (S1-1, S1-2).

The flow identification unit 12 identifies the registered flow by comparing the result obtained by the packet analysis unit 11 with the rule registered in the rule table (S1-3: identification step). In the case of the registered flow (S1-4: YES), the per-registered flow traffic aggregation unit 13 aggregates the traffic of each registered flow (S1-5: traffic aggregation step), and the aggregation file generation unit 14 generates an aggregation file (S1-6) and stores the aggregation file in a storage unit #1 15 (S1-10).

When the flow is not the registered flow (S1-4: NO), the unregistered traffic aggregation unit aggregates the traffic of the unregistered flow and calculates the total value of the unregistered traffic amounts (S1-7). The aggregation file generation unit 14 generates an aggregation file (S1-8) and transmits the total value of the unregistered traffic amounts to the per-unregistered flow traffic estimation unit 26.

The per-unregistered flow traffic estimation unit 26 calculates an estimated value of the traffic amount of the flow for each unregistered flow by multiplying the total value of the unregistered traffic amounts by the occurrence probability of each unregistered flow obtained by the occurrence probability calculation unit 25 (S1-9: traffic estimation step), and stores the calculation result in the storage unit #1 15 (S1-10).

Traffic Estimation Operation

Figure 4:
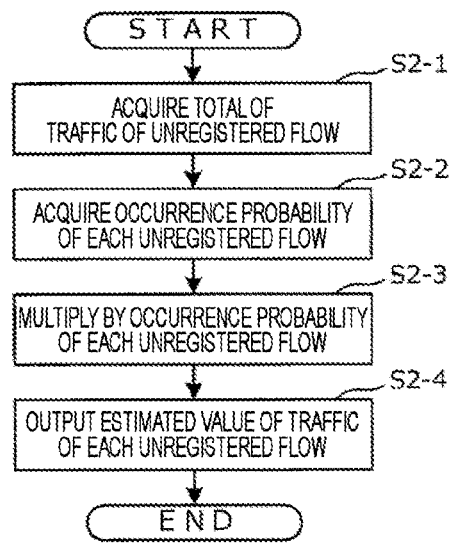
FIG. 4 is a flowchart illustrating an operation flow of traffic estimation according to the first embodiment of the present invention.

FIG. 4 is a flowchart illustrating an operation flow of traffic estimation according to the first embodiment of the present invention. The per-unregistered flow traffic estimation unit 26 acquires the total of the unregistered traffic from the aggregation file generation unit 14 (S2-1), acquires the occurrence probability of each unregistered flow from the occurrence probability calculation unit 25 (S2-2), multiplies the total value of the unregistered traffic amounts by the occurrence probability of each unregistered flow (S2-3), and outputs the multiplied result as an estimated value of the traffic amount of each unregistered flow (S2-4).

The per-unregistered flow traffic aggregation unit can obtain an estimated value of the traffic amount of each flow of the unregistered flows in real time by multiplying the traffic amount of the entire unregistered flows obtained by the unregistered traffic aggregation unit by the occurrence probability of each flow obtained from the occurrence probability calculation unit 25.

Packet Sampling

Figure 5:
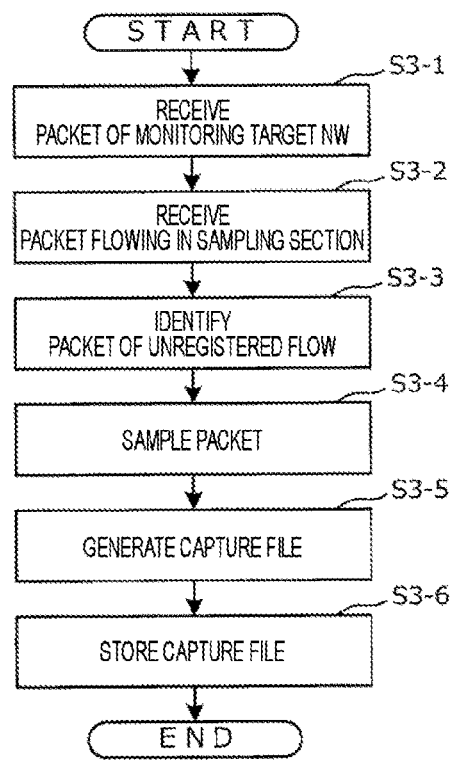
FIG. 5 is a flowchart illustrating an operation flow of packet sampling according to the first embodiment of the present invention.

FIG. 5 is a flowchart illustrating an operation flow of packet sampling according to the first embodiment of the present invention.

The filtering unit 21 receives a packet of the monitoring target network 200, and identifies a packet of an unregistered flow from a packet group flowing into a predetermined sampling section (S3-1, S3-2, S3-3). The sampling capturing unit 22 samples and holds packets at equal intervals or random intervals (S3-4). When the sampling section ends, the capture file generation unit 23 generates a capture file by using the sampling packet group held so far and stores the capture file in the storage unit #2 24 (S3-5, S3-6).

Calculation of Occurrence Probability of Each Flow

Figure 6:
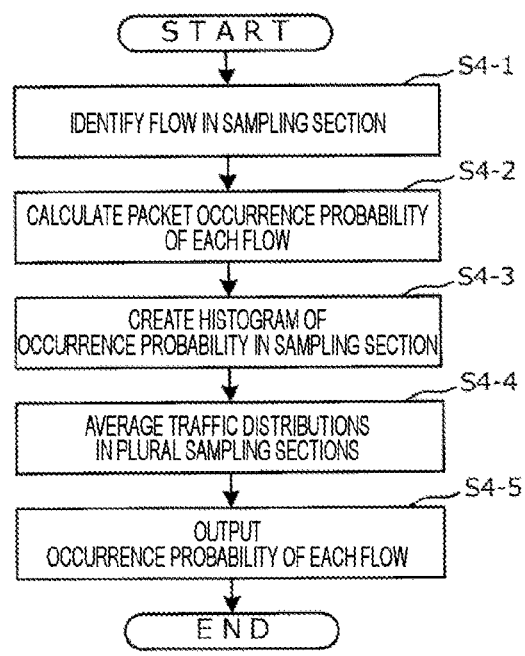
FIG. 6 is a flowchart illustrating an operation flow of calculating an occurrence probability of each flow according to the first embodiment of the present invention.

FIG. 6 is a flowchart illustrating an operation flow of calculating an occurrence probability of each flow according to the first embodiment of the present invention. In the present embodiment, an occurrence probability of each flow is calculated using a result of sampling traffic of an unregistered flow.

The occurrence probability calculation unit 25 identifies the flow of the packet sampled within the sampling section from the capture file held in the storage unit #2 24, calculates the occurrence probability of each of the unregistered flows within the section, and generates the traffic distribution (histogram) in the section (S4-1, S4-2, S4-3).

The occurrence probability calculation unit 25 further performs averaging and normalization processing by using traffic distributions similarly generated in the latest predetermined number M of sampling sections, and calculates the occurrence probability of each flow of the unregistered flow (S4-4: occurrence probability calculation step). The per-unregistered flow traffic estimation unit 26 is notified of the calculated occurrence probability of each flow of the unregistered flow (S4-5).

When the sampling section described above ends, the occurrence probability using the average traffic distribution is recalculated and updated by repeating defining the sampling section again and performing similar processing.

Since the time required for the update processing of the occurrence probability can be arbitrarily set and the calculation of the occurrence probability does not need to be processed in real time, not only the estimation of the traffic amount of a large number of unregistered flows using the low-speed and large-capacity memory can be performed, but also the calculation of the occurrence probability can be implemented by software.

The per-unregistered flow traffic aggregation unit can obtain an estimated value of the traffic amount of each flow of the unregistered flows in real time by multiplying the traffic amount of the entire unregistered flows obtained by the unregistered traffic aggregation unit by the occurrence probability of each flow obtained from the occurrence probability calculation unit 25.

As described above, the traffic monitoring device 10 of the present embodiment is configured to perform real-time monitoring of the traffic amount of the flow corresponding to the registered rule and calculate the estimated value of the traffic amount of the flow corresponding to the unregistered rule and monitor the estimated value in real time.

The estimated value of the traffic amount of the unregistered flows is calculated by multiplying the total traffic amount of the unregistered flows by the occurrence probability of each of the unregistered flows. The acquisition of the total traffic amount and the calculation of the estimated value of the traffic amount by multiplying by the occurrence probability are performed as real-time processing, and the occurrence probability is set to an average value of the plurality of sampling sections, so that calculation and update of the occurrence probability is performed as non-real-time processing.

With such a configuration, it is possible to estimate the traffic amount of a large number of unregistered flows by using the low-speed and large-capacity memory, and it is possible to monitor the traffic amount of a large number of flows both inside and outside the registration in real time. In addition, in calculating the traffic distribution of the unregistered flow, by setting the average value of the plurality of latest sampling sections, it is possible to suppress the influence of the bias of the flow generation in the specific sampling section and to calculate a more accurate estimated value of the traffic amount.

Second Embodiment

Figure 7:
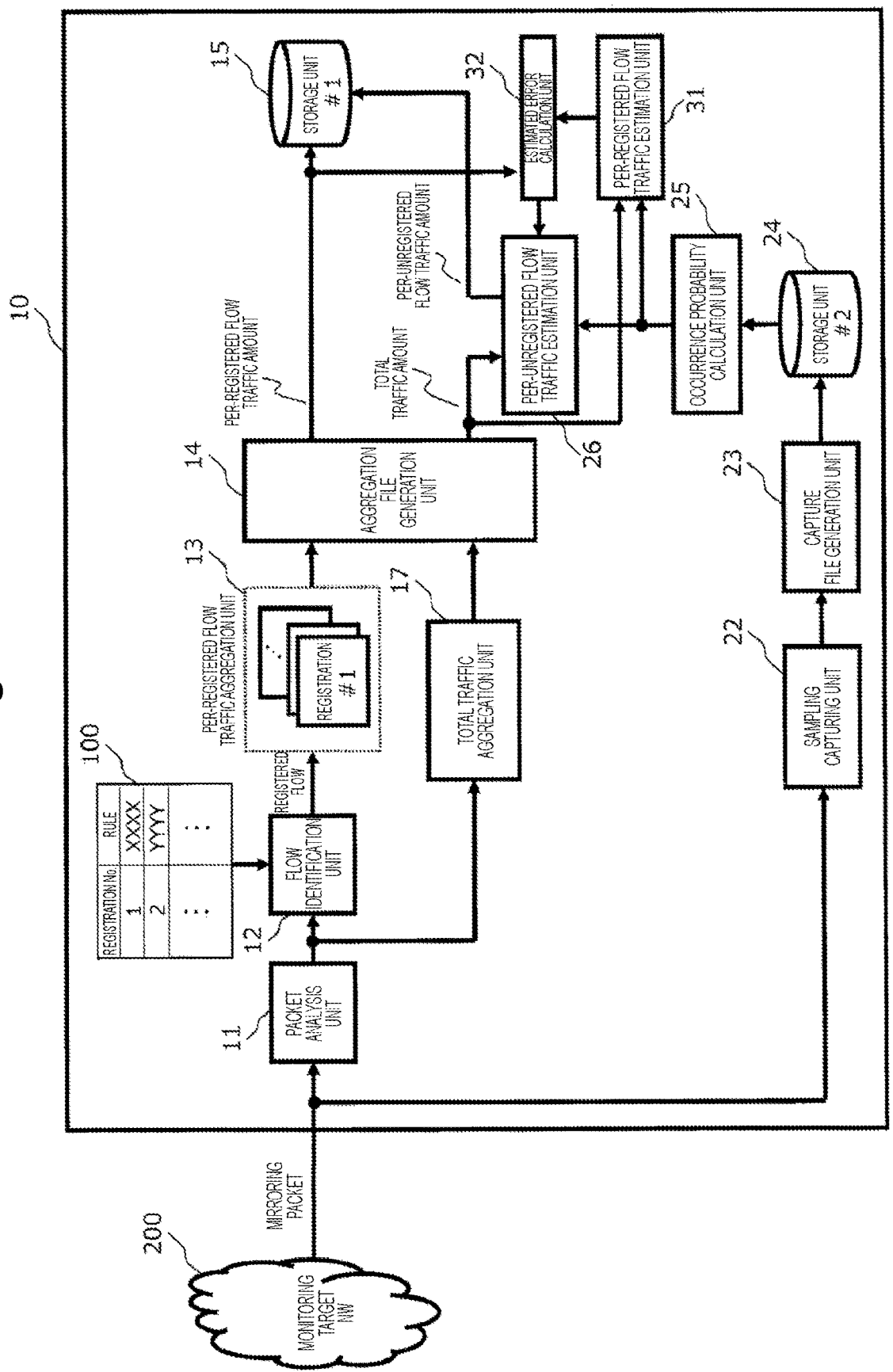
FIG. 7 is a diagram illustrating a configuration example of a traffic monitoring device according to a second embodiment of the present invention.

FIG. 7 is a diagram illustrating a configuration example of a traffic monitoring device according to a second embodiment of the present invention. The second embodiment is different from the first embodiment in that the total traffic aggregation unit 17 that aggregates the traffic amounts of all the flows is provided instead of the unregistered traffic aggregation unit, and as similar to the unregistered flow, the estimated value of the traffic amount is calculated also for the flow corresponding to the registered rule, and an error range of the estimated value of the traffic amount of the unregistered flow is output from a difference from an actually measured value of a traffic amount actually measured.

Figure 8:
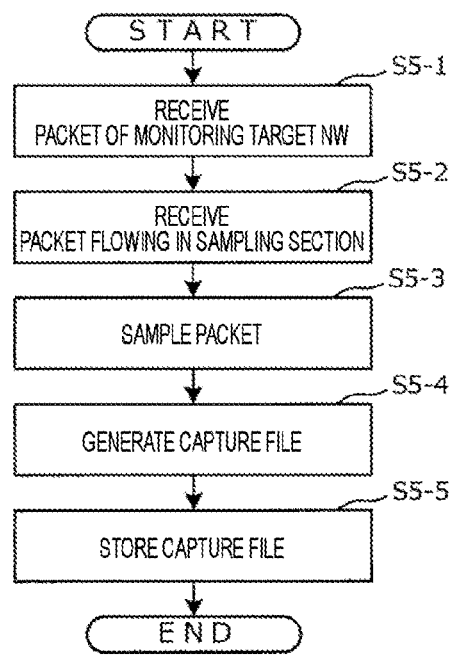
FIG. 8 is a flowchart illustrating an operation flow of packet sampling according to the second embodiment of the present invention.

FIG. 8 is a flowchart illustrating an operation flow of packet sampling according to the second embodiment of the present invention. In the second embodiment, since the estimated value of the traffic amount is calculated not only for the unregistered flow but also for the flow corresponding to the registered rule, the packets of all the flows are sampled.

The sampling capturing unit 22 receives packets from the monitoring target network 200, samples all the packets at equal intervals or random intervals, and holds the packets (S5-1, S5-2, S5-3). When the sampling section ends, the capture file generation unit 23 converts the sampling packet group held so far into a file and stores the file in the storage unit #2 24 (S5-4, S5-5).

The occurrence probability calculation unit 25 performs processing similar to that in FIG. 6 for packets of all the flows. The occurrence probability calculation unit 25 identifies the flow of the packet sampled within the sampling section from the capture file held in the storage unit #2 24, calculates the occurrence probability of each of all registered/unregistered flows within the section, and generates the traffic distribution (histogram) in the section.

The average traffic distribution update unit capable of managing a large amount of unregistered rules in the low-speed and large-capacity memory further performs averaging and normalization processing by using traffic distributions similarly generated in the latest predetermined number M of sampling sections, and calculates an average traffic distribution of the registered/unregistered flow group. Each of the per-registered flow traffic estimation unit 31 and the per-unregistered flow traffic estimation unit 26 is notified of obtained average traffic distribution.

Figure 9:
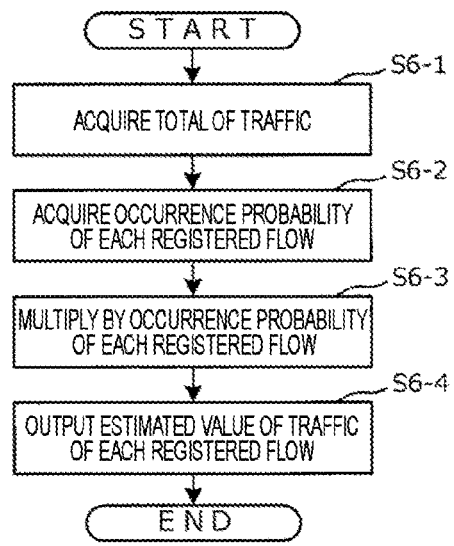
FIG. 9 is a flowchart illustrating an operation flow of traffic estimation according to the second embodiment of the present invention.

FIG. 9 is a flowchart illustrating an operation flow of traffic estimation according to the second embodiment of the present invention. The per-registered flow traffic estimation unit 31 acquires the total traffic amount aggregated by the total traffic aggregation unit 17 (S6-1), and calculates an estimated value of the traffic amount of the registered flow by multiplying the acquired total traffic amount by the occurrence probability obtained by the occurrence probability calculation unit 25 (S6-2, S6-3, S6-4).

Figure 10:
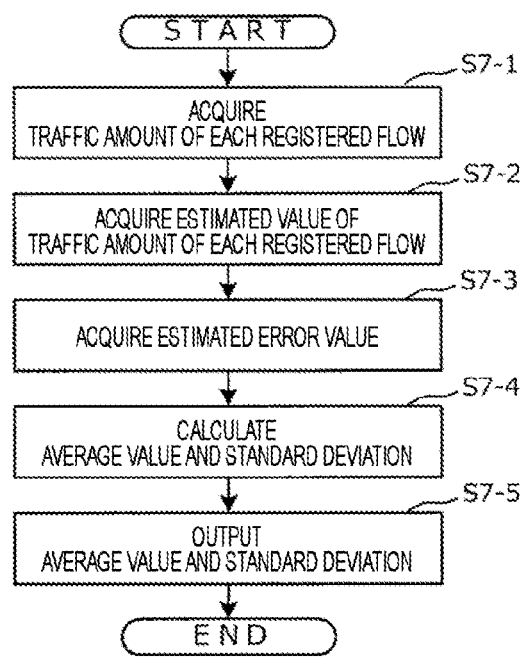
FIG. 10 is a flowchart illustrating an operation flow of traffic estimation according to the second embodiment of the present invention.

FIG. 10 is a flowchart illustrating an operation flow of traffic estimation according to the second embodiment of the present invention. An estimated error calculation unit 32 calculates a difference between the estimated value of the traffic amount of each registered flow calculated by the per-registered flow traffic estimation unit 31 and the actual traffic amount of the corresponding flow aggregated by the per-registered flow traffic aggregation unit 13, and acquires an estimated error value (S7-1, S7-2, S7-3). This processing is performed for all the registered flows, an average value μ and a standard deviation a of the estimated error values are calculated, and the per-unregistered flow traffic estimation unit is notified of the obtained average value μ and standard deviation 6 (S7-4, S7-5).

As similar to FIG. 6, the per-unregistered flow traffic estimation unit 26 obtains an estimated value of the traffic amount of the unregistered flow by multiplying the total traffic amount aggregated by the total traffic aggregation unit 17 by the occurrence probability obtained by the occurrence probability calculation unit 25.

The per-unregistered flow traffic estimation unit 26 further calculates a value obtained by adding μ+nσ (n=2 or 3) to the traffic amount of the flow as the estimated maximum value. As similar to this, a value obtained by adding μ−nσ to the traffic amount of the flow is calculated as the estimated minimum value. A range from the estimated minimum value or more and the estimated maximum value or less is a possible range of the traffic amount in which the flow is highly likely to exist. The per-unregistered flow traffic estimation unit 26 calculates and outputs the range for each unregistered flow in addition to the estimated value of the traffic amount of the unregistered flow.

As described above, in the present embodiment, since the per-unregistered flow traffic estimation unit 26 is configured to output the possible range of the estimated value of the traffic amount in addition to the estimated value of the traffic amount of the unregistered flow, it is possible to evaluate the accuracy of the estimated value of the traffic amount of the unregistered flow and to more accurately analyze the traffic amount and detect the failure of the monitoring target network 200.

Third Embodiment

Figure 11:
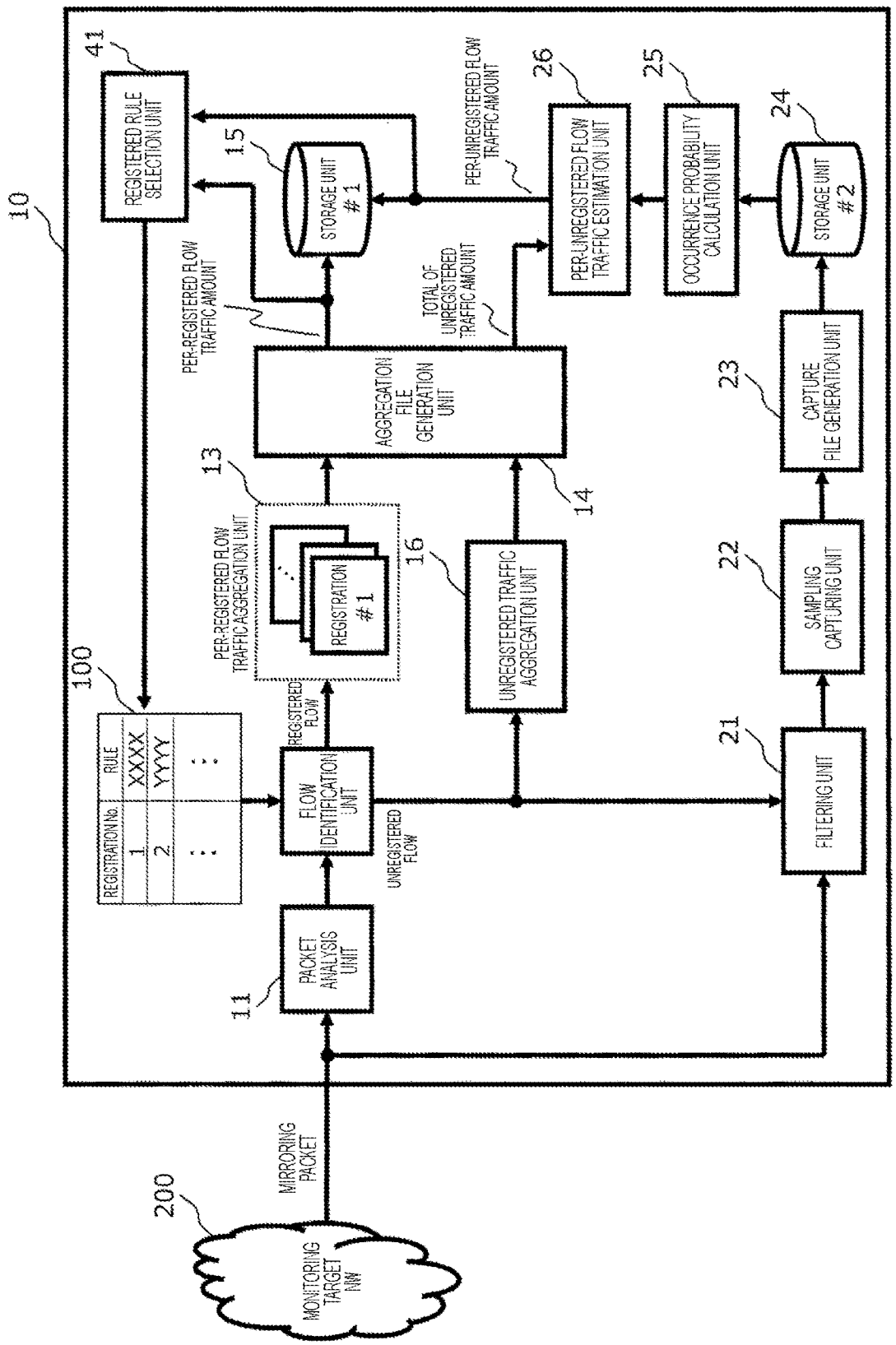
FIG. 11 is a diagram illustrating a configuration example of a traffic monitoring device according to a third embodiment of the present invention.

FIG. 11 is a diagram illustrating a configuration example of a traffic monitoring device according to a third embodiment of the present invention. The traffic monitoring device 10 of the present embodiment is different from the configuration of the first embodiment in that the registered rule selection unit 41 is provided.

Figure 12:
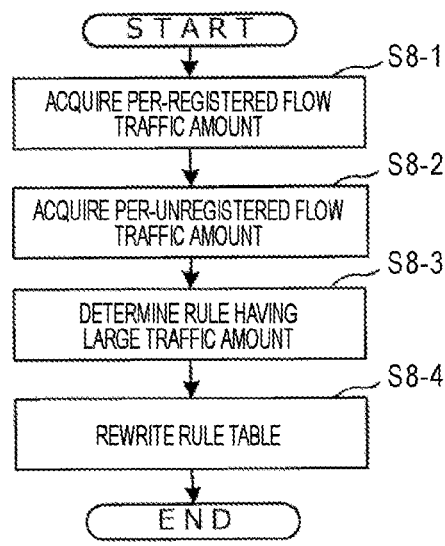
FIG. 12 is a flowchart illustrating an operation flow of registered rule selection according to the third embodiment of the present invention.

FIG. 12 is a flowchart illustrating an operation flow of registered rule selection according to the third embodiment of the present invention. The registered rule selection unit 41 acquires the traffic amount of the registered flow and the traffic amount of the unregistered flow (S8-1, S8-2), determines a rule to be recorded in the rule table 100 so that the rule is recorded in the rule table 100 in descending order of the traffic amount from the traffic amount of the registered flow and the estimated value of the traffic amount of the unregistered flow, and rewrites the rule table 100 (S8-3, S8-4).

According to the present embodiment, by rewriting the rule table 100 according to the traffic amount and repeating re-registration of a flow having a large traffic amount among the registered flow and the unregistered flow as the registered flow, it is possible to avoid that a flow having a small traffic amount and a low possibility of occurrence of a failure among the registered flows is continuously registered in the rule table 100. On the other hand, there is a risk that a failure occurs due to a large traffic amount, and a flow that requires detailed analysis is recorded in the rule table 100, which facilitates failure detection of the monitoring target network 200.

Fourth Embodiment

Figure 13:
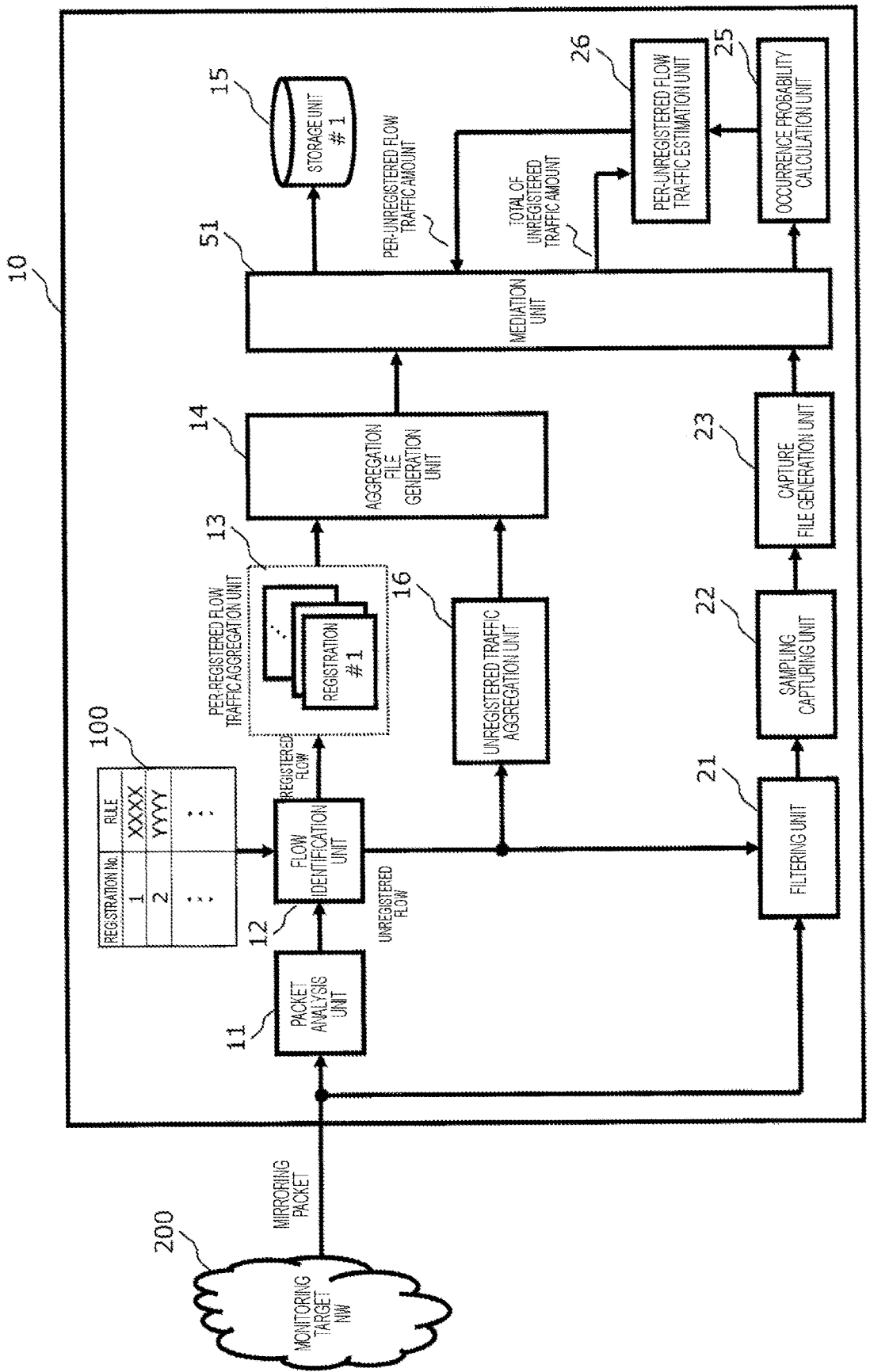
FIG. 13 is a diagram illustrating a configuration example of a traffic monitoring device according to a fourth embodiment of the present invention.

FIG. 13 is a diagram illustrating a configuration example of a traffic monitoring device according to a fourth embodiment of the present invention. The traffic monitoring device 10 of the present embodiment is different from the first embodiment in that it includes one storage unit, a mediation unit 51 that mediates between the aggregation file generation unit 14 and the capture file generation unit 23 with respect to writing to the storage unit, and mediates between reading of the total value of the traffic amounts of each registered flow and reading of the capture file for calculating the occurrence probability with respect to reading from the storage unit.

As the processing of the mediation unit 51, a configuration may be made such that the aggregation file generation unit 14 is prioritized in the writing to the storage unit, and the reading of the total value of the traffic amounts of each registered flow can be configured to be prioritized in the reading from the storage unit. By including the mediation unit 51, it is possible to efficiently perform the aggregation processing of the traffic amount of the registered flow and the estimation processing of the traffic amount of the unregistered flow without providing a plurality of storage units.

Configuration Example of Traffic Monitoring Device

The traffic monitoring device 10 in the present embodiments can be implemented in various forms. For example, the traffic monitoring device 10 may be achieved by hardware of a board on a computer. For example, a configuration in which a general computer and a field-programmable gate array (FPGA) accelerator are combined can be considered. The use of the FPGA accelerator can speed up packet processing, which is effective for traffic monitoring in a high-speed network.

On the other hand, since the high-speed packet processing is not required in the low-speed network, the function of the traffic monitoring device 10 may be achieved by a computer in which all the processing is implemented by software.

Figure 14:
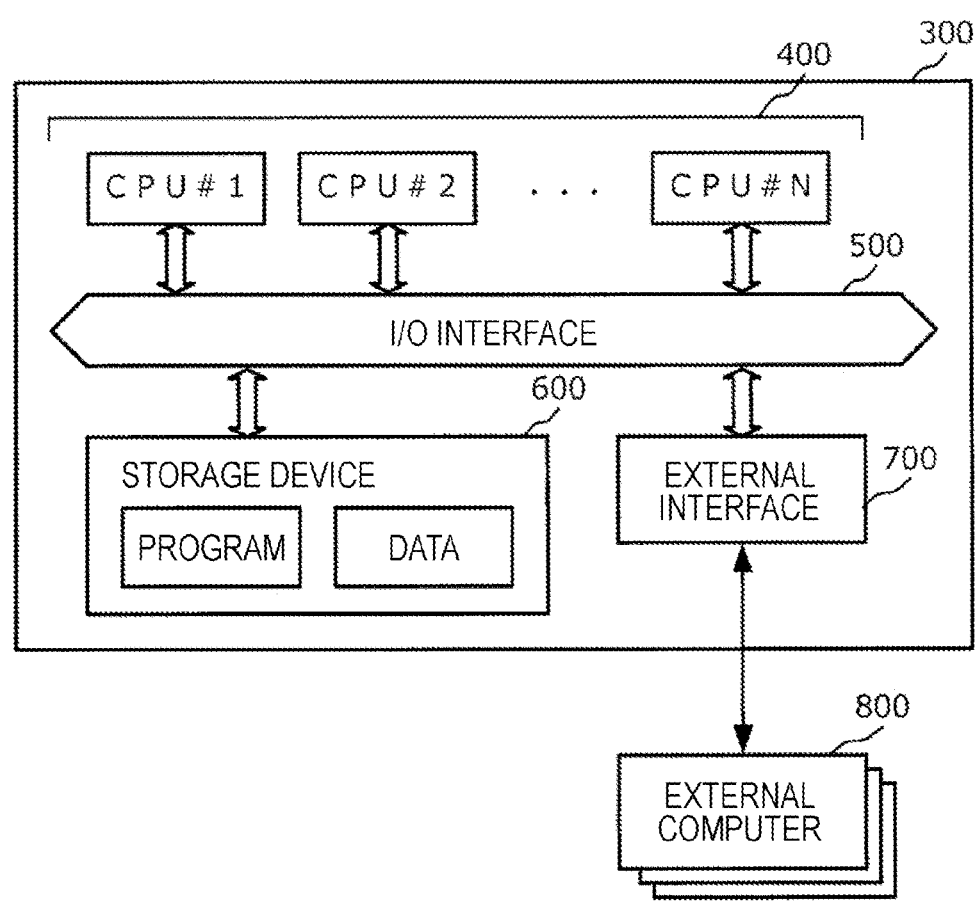
FIG. 14 is a configuration example of a computer for achieving a traffic monitoring device according to the present embodiments.
Figure 15:
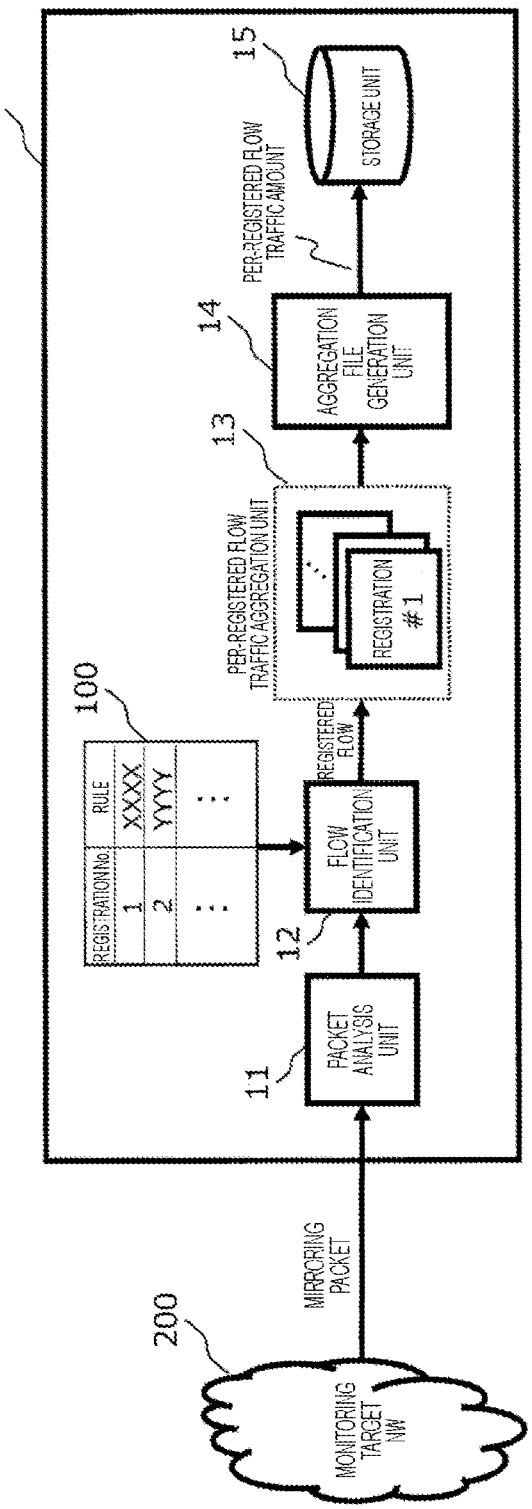
FIG. 15 is a diagram illustrating a configuration of a conventional traffic monitoring device.

A configuration example of a computer operating as the traffic monitoring device 10 is illustrated in FIG. 14. Each unit of the traffic monitoring device 10 of the present embodiments can be implemented by a computer including a central processing unit (CPU), a storage device, and an external interface (hereinafter, external I/F) and a program for controlling those hardware resources.

The computer 300 includes a CPU 400, a storage device 600, and an external I/F 700, which are connected to each other via an I/O interface 500. A program or the like for achieving the operation of the traffic monitoring processing of the present embodiments and data such as a capture file are stored in the storage device 600, and another external computer 800 that transmits and receives a signal, a computer constituting a network, or the like is connected to the external I/F 700. The CPU 400 can execute the traffic monitoring processing described in the present embodiments according to a processing program or the like stored in the storage device 600. The processing program can be recorded in a computer-readable recording medium or can be provided via a network.

Extension of Embodiments

Although embodiments of the present invention have been described with reference to exemplary embodiments, the embodiments of the present invention are not limited to the above embodiments. Various changes that can be understood by those skilled in the art can be made in the configuration of the embodiments of the present invention within the scope of the embodiments of the present invention.

REFERENCE SIGNS LIST

10 Traffic monitoring device
11 Packet analysis unit
12 Flow identification unit
13 Per-registered flow traffic aggregation unit
14 Aggregation file generation unit
15 Storage unit
16 Unregistered traffic aggregation unit
21 Filtering unit
22 Sampling capturing unit
23 Capture file generation unit
24 Storage unit
25 Occurrence probability calculation unit
26 Per-unregistered flow traffic estimation unit
100 Rule table
200 Monitoring target network

The invention claimed is:

1. A traffic monitoring device, the device comprising:
one or more processors; and
a storage device storing a program to be executed by the one or more processors, the program including instructions for:
identifying a flow of each packet of a plurality of packets received from a monitoring target network as a first flow of a first flow group or a second flow of a second flow group different from the first flow group based on a rule table in which a predetermined rule is registered;
aggregating a traffic amount of each of the first flows of the first flow group;
calculating an occurrence probability of each flow based on a result of sampling the flows of the plurality of packets; and
estimating the traffic amount of each of the second flows of the second flow group by multiplying a total value of the traffic amount of the second flow group by the occurrence probability of each of the second flows of the second flow group.

2. The device according to claim 1, wherein the program further includes instructions for:
capturing the packet of the flow that has flowed into a sampling section at a predetermined interval;
calculating the occurrence probability of the flow in the sampling section from the packet that has been captured; and
calculating the occurrence probability of each flow by averaging and normalizing pieces of the occurrence probability in a plurality of the sampling sections.

3. The device according to claim 2, wherein the program further includes instructions for:
calculating an estimated value of the traffic amount of each of the first flows of the first flow group by multiplying the traffic amount of the flow of the packet that has been received by the occurrence probability of each flow; and
estimating a maximum value and a minimum value of the traffic amount of each of the second flows of the second flow group by using a difference between the aggregated traffic amount of each of the first flows of the first flow group and the estimated value of the traffic amount of each of the first flows of the first flow group.

4. The device according to claim 3, wherein the rule of the rule table is determined based on the aggregated traffic amount of each of the first flows of the first flow group and the estimated value of the traffic amount of each of the second flows of the second flow group.

5. The device according to claim 2, wherein the rule of the rule table is determined based on the aggregated traffic amount of each of the first flows of the first flow group and the estimated value of the traffic amount of each of the second flows of the second flow group.

6. The device according to claim 1, wherein the program further includes instructions for:
calculating an estimated value of the traffic amount of each of the first flows of the first flow group by multiplying the traffic amount of the flow of the packet that has been received by the occurrence probability of each flow; and
estimating a maximum value and a minimum value of the traffic amount of each of the second flows of the second flow group by using a difference between the aggregated traffic amount of each of the first flows of the first flow group and the estimated value of the traffic amount of each of the first flows of the first flow group.

7. The device according to claim 1, wherein the rule of the rule table is determined based on the aggregated traffic amount of each of the first flows of the first flow group and the estimated value of the traffic amount of each of the second flows of the second flow group.

8. A traffic monitoring method in a traffic monitoring device that monitors traffic of a plurality of packets flowing through a monitoring target network, the method comprising:
identifying a flow of each packet of the plurality of packets received from the monitoring target network into a first flow of a first flow group or a second flow of a second flow group different from the first flow group based on a rule table in which a predetermined rule is registered;
aggregating a traffic amount of each of the first flows of the first flow group;
calculating an occurrence probability of each flow based on a result of sampling the flows of the plurality of packets; and
estimating the traffic amount of each of the second flows of the second flow group by multiplying a total value of the traffic amount of the second flow group by the occurrence probability of each of the second flows of the second flow group.

9. The method according to claim 8, wherein calculating the occurrence probability of each flow further comprises:
capturing the packet of the flow that has flowed into a sampling section at a predetermined interval;
calculating the occurrence probability of the flow in the sampling section from the packet that has been captured; and
calculating the occurrence probability of each flow by averaging and normalizing pieces of the occurrence probability in a plurality of the sampling sections.

10. The method according to claim 9, wherein estimating the traffic amount further comprises:
calculating an estimated value of the traffic amount of each of the first flows of the first flow group by multiplying the occurrence probability of each flow by the traffic amount of the flow of the packet that has been received; and
estimating a maximum value and a minimum value of the traffic amount of each of the second flows of the second flow group by using a difference between the aggregated traffic amount of each of the first flows of the first flow group and the estimated value of the traffic amount of each of the first flows of the first flow group.

11. The method according to claim 10, wherein the rule of the rule table is determined based on the aggregated traffic amount of each of the first flows of the first flow group and the estimated value of the traffic amount of each of the second flows of the second flow group.

12. The method according to claim 9, wherein the rule of the rule table is determined based on the aggregated traffic amount of each of the first flows of the first flow group and the estimated value of the traffic amount of each of the second flows of the second flow group.

13. The method according to claim 8, wherein estimating the traffic amount further comprises:
calculating an estimated value of the traffic amount of each of the first flows of the first flow group by multiplying the occurrence probability of each flow by the traffic amount of the flow of the packet that has been received; and
estimating a maximum value and a minimum value of the traffic amount of each of the second flows of the second flow group by using a difference between the aggregated traffic amount of each of the first flows of the first flow group and the estimated value of the traffic amount of each of the first flows of the first flow group.

14. The method according to claim 8, wherein the rule of the rule table is determined based on the aggregated traffic amount of each of the first flows of the first flow group and the estimated value of the traffic amount of each of the second flows of the second flow group.

15. A traffic monitoring method in a traffic monitoring device that monitors traffic of a plurality of packets flowing through a monitoring target network, the method comprising:
identifying a flow of each packet of the plurality of packets received from the monitoring target network into a registered flow or an unregistered flow based on a rule table in which a predetermined rule is registered;
for each of the registered flows, aggregating a traffic amount of each of the registered flows;
for each of the unregistered flows, aggregating the traffic amount of each of the unregistered flows and calculating a total value of the traffic amounts of the unregistered flows;
calculating an occurrence probability of each of the unregistered flows based on a result of sampling the flows of the plurality of packets; and
estimating the traffic amount of each of the unregistered flows by multiplying the total value of the traffic amounts of the unregistered flows by the occurrence probability of each of the unregistered flows.

16. The method according to claim 15, wherein estimating the traffic amount of each of the unregistered flows comprises:
obtaining the total value of the traffic amounts of the unregistered flows;
acquiring the occurrence probability of each of the unregistered flows;
multiplying the total value of the traffic amounts of the unregistered flows by the occurrence probability of each of the unregistered flows; and
outputting the multiplied result as an estimated value of the traffic amount of each of the unregistered flows.

17. The method according to claim 15, wherein sampling the flows of the plurality of packets comprises:
identifying the flow of each of the packets sampled within a sampling section;
calculating the occurrence probability of each of the unregistered flows within the sampling section; and
generating a traffic distribution in the sampling section.

18. The method according to claim 17, wherein sampling the flows of the plurality of packets further comprises performing averaging and normalization processing by using a plurality of the traffic distributions generated for a plurality of the sampling sections to calculate the occurrence probability of each of the unregistered flows.

\* \* \* \* \*